United States Patent [19]

Carter

[11] Patent Number: 5,234,060
[45] Date of Patent: Aug. 10, 1993

[54] PRESSURE AND DEPTH CONTROL IN AGRICULTURAL IMPLEMENT

[75] Inventor: Lyle M. Carter, Shafter, Calif.

[73] Assignee: The United States of America as represnted by the Secretary of Agriculture, Washington, D.C.

[21] Appl. No.: 839,000

[22] Filed: Feb. 21, 1992

[51] Int. Cl.⁵ .............................................. A01B 63/22
[52] U.S. Cl. ................................ 172/413; 172/260.5; 172/407; 172/4; 172/423
[58] Field of Search ............... 172/407, 395, 239, 413, 172/4, 260.5, 417, 448, 423, 424, 427, 663, 675; 111/926, 62, 134, 135

[56] References Cited

U.S. PATENT DOCUMENTS

| | | | |
|---|---|---|---|
| 3,561,541 | 2/1971 | Woelfel | 172/260.5 |
| 3,878,901 | 4/1975 | Robertson, Sr. | 172/413 |
| 4,031,966 | 6/1977 | Farrell | 172/260.5 |
| 4,275,670 | 6/1981 | Dreyer | 111/926 |
| 4,300,640 | 11/1981 | Baxter et al. | 172/413 |
| 4,306,732 | 12/1981 | Pettibone | 172/413 |
| 4,423,788 | 1/1984 | Robinson, Jr. et al. | 172/427 |
| 4,909,331 | 3/1990 | Defranco | 172/4 |
| 4,913,070 | 4/1990 | Morrison, Jr. | 172/4 |

FOREIGN PATENT DOCUMENTS 1533418  1/1990  U.S.S.R. .................. 111/926

Primary Examiner—David H. Corbin
Assistant Examiner—Spencer Warnick
Attorney, Agent, or Firm—M. Howard Silverstein; John D. Fado

[57] ABSTRACT

A soil contacting implement and depth gauging wheel at a predetermined vertical distance from the implement are provided for attachment to a tractor. Upward or downward movement of the wheel on the soil causes a deviation from the predetermined vertical displacement thereby triggering an adjustment to the downward force on the implement so as to reestablish the predetermined displacement. The magnitude of the predetermined displacement manually may be altered. In addition, the downward force of the wheel manually is adjustable without altering the magnitude of the predetermined displacement.

6 Claims, 3 Drawing Sheets

PRESSURE AND DEPTH CONTROL IN AGRICULTURAL IMPLEMENT

FIELD OF INVENTION

The present invention pertains to control of ground contact implements such as seeders, tillers, cultivators, plows, fertilizers, and pesticide applicators.

PRIOR ART

Depth control devices are known in this art, as exemplified by U.S. Pat. No. 4,913,070 that describes a dynamic position or depth control for ground contact implements. These devices employ press or gauge wheel(s) to help control the depth of the implement. One of the problems associated with such systems is the inability of the ground contact implement and the presswheel to accommodate widely varying soil conditions. This especially is troublesome in soft soils where the presswheels may cause excessive compaction, and the implement may penetrate too far into the ground.

To eliminate excessive planter sinkage with potential machine failure and seed germination failure within wet or loose soil areas of a field, the maximum force may be limited. However, under such limiting conditions, insufficient force is available in other areas for proper penetration.

Thus, in prior art planters, seed depth is reduced in dry or firm areas of the field, or seeds are placed too deeply or with excessive compaction in loose areas.

SUMMARY OF INVENTION

The present invention constitutes a new control system for ground contact implements in which dynamic vertical force control is provided in combination with dynamic depth control. Broadly, the apparatus comprises a. first adjustable downpressure means connected to the ground contact implement;

b. depth gauging wheels adjacent the implement;

c. means to adjust the vertical displacement of the wheels so as to establish a predetermined vertical distance between the wheels and implement;

d. control means operably connected to the wheels and first adjustable downpressure means to control the amount or degree of downpressure on the implement in response to upward or downward movement of the wheels on the soil, so as to maintain a substantially constant vertical distance between the wheels and implement; and e. second adjustable downpressure means connected to the wheels to adjust pressure without affecting vertical displacement.

The "first" adjustable downpressure means on the ground contact implement may include positive lifting means to lift the implement.

Therefore, it is an object of the present invention to provide means to control the downward force on a presswheel, while independently providing means to adjust the height or vertical displacement of the presswheel relative to the ground contact implement.

A further object is to provide an implement depth control system in which the presswheel is able to accommodate soils that vary from very soft to very hard.

Still a further object is to provide an implement depth control system in which the presswheel will not sink unacceptably so as to adversely affect the depth of seed planting or other action.

Yet another object is to provide a single strut or crank connected to a presswheel that is able to provide both control of the vertical displacement of the presswheel and pressure control on the wheel independent of the vertical displacement control.

Still another object is to provide positive means to lower and raise a ground contact implement.

Furthermore, another object is to provide a ground contact implement control system that is capable of applying a force to raise, as well as to lower, the implement.

A further object is to provide a control system wherein the downward force provided by the ground contact implement on the soil may be reduced to less than the weight of the implement itself.

Furthermore, an object is to provide a system to maintain implement depth over a total range of soil strengths.

Still another object is to combine dynamic vertical force control with dynamic vertical position control.

Yet another object is to permit adjustment to a specified degree of soil compaction from near zero while maintaining constant seed depth independent of soil topography and soil tilth, and yet provide dynamic and sufficient downward force for furrow opening penetration in soils of varying strength and density.

Other objects and advantages will be obvious from the following detailed description of the invention in which FIG. 1 illustrates the present invention.

DETAILED DESCRIPTION

Figure 1:
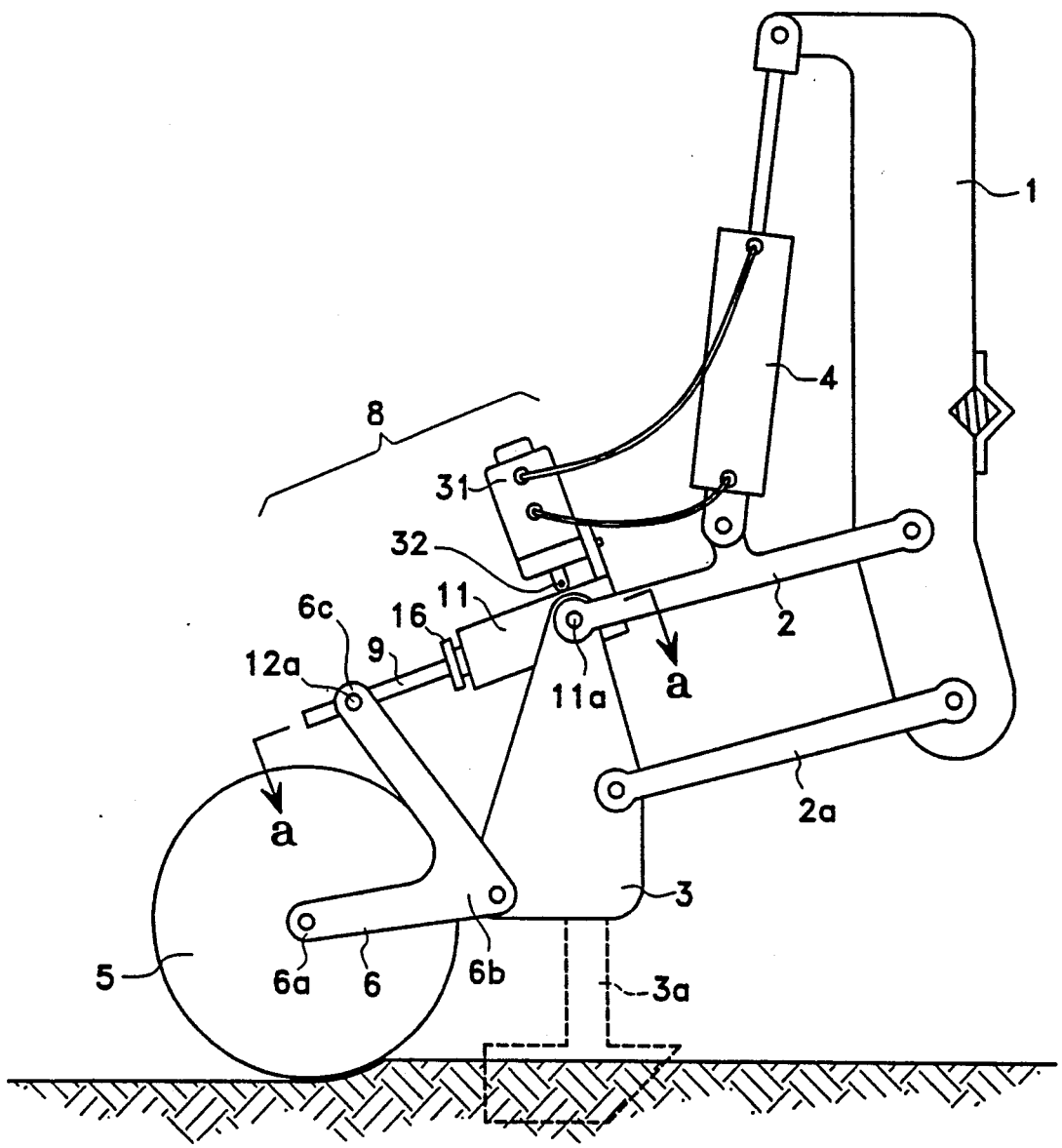

Referring to FIG. 1, reference numeral 1 designates a tool bar frame that is rigidly connected to a tractor (not shown) by means of, for example, a tool bar and standard three-point hitch.

Parallel links 2 and 2a pivotally connect implement frame 3 to the tool frame. Ground contact implements, such as a single-sword-opener (disk-opener) planter 3a may be secured, as by bolting, to implement frame 3. The first adjustable downpressure means disclosed in the Summary that is connected to the ground contact implement primarily is provided by a double acting cylinder 4 pivotally connected to the tool frame and the upper parallel link 2.

Press or gauge wheel 5 is connected to the implement frame by means of a strut or crank 6 having a lower arm extremity 6a, an elbow 6b and an upper arm extremity 6c. Lower extremity 6a is pivotally connected to the axis of the presswheel; elbow 6b is pivotally connected to the planter frame; and upper extremity 6c is pivotally connected to a multiple-control member 8 which in turn is pivotally connected to the implement frame 3.

Multiple-control member 8 provides several functions: means to adjust the vertical elevation of the presswheel; means to maintain a predetermined vertical distance or displacement between the presswheel and ground contact implement; and means to adjust the downward pressure on the presswheel without affecting the vertical displacement of the presswheel.

Figure 2:
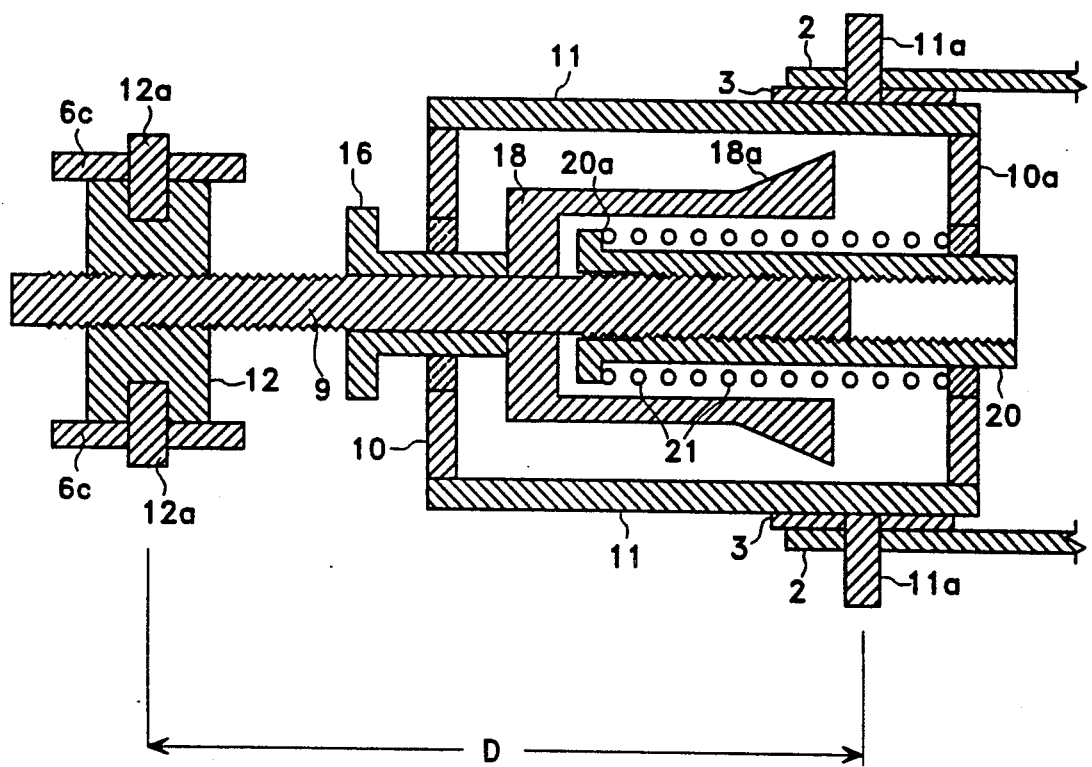
FIG. 2 is a top cross-sectional view of part of the multiple-control member of FIG. 1 as viewed along line a—a in FIG. 1.

Some of the details of multiple-control member 8 are illustrated in the top view of FIG. 2. Referring thereto, said member comprises a rod 9 that is threaded at both ends. The left end of the rod, as viewed in the figures, may be milled to include a plurality of flats to permit rotation of the rod by means of a wrench. Alternatively, a crank (not shown) may be connected to the left end of the rod for such purposes. The right end of the rod partially is surrounded by front and rear plates 10 and 10a, and two side plates 11. Each of these latter plates includes a pivot 11a having a link 2 and implement frame 3 mounted thereupon, whereby the ground contact implement is sandwiched between two implement frames. Pivot 11a is connected to double acting cylinder 4 through links 2.

The means to adjust vertical displacement of the presswheel is provided as follows: Screwed upon the threaded left end of rod 9 is a nut 12 having two pivots 12a, and each pivot includes a separate upper arm extremity 6c of the strut or crank 6 (FIG. 1) mounted thereupon, so that there is a presswheel on both sides of the ground contact implement. It can be seen that rotation of rod 9 results in longitudinal movement of nut 12 (and arm extremities 6c) along rod 9, thereby raising or lowering presswheel 5 with respect to the ground contact implement, due to the resultant displacement of strut or crank 6 (FIG. 1).

Fixed to the intermediate section of the rod 9, and to one another, are an input spool 16 and cam spool 18. Nested within the cam spool is a spring tension spool 20 that is surrounded by a spring 21. Spring tension spool 20 includes a lip 20a that presses against spring 21.

Spring tension spool 20 is threaded on its interior wall so that it is screwed upon the threaded right end of rod 9. Due to the fact that spring 21 pushes the spring tension spool to its left (as viewed in the figure), the spring tension spool firmly grips the rod at the threaded interface between spool and rod so that the act of rotating the rod also results in rotation of the spring tension spool. Bushings in front and rear plates 10 and 10a facilitate rotation of the rod and spring tension spool.

The spring tension spool may be turned without rotation of the rod by holding the rod's left end in place, and turning the spring tension spool at the point where it projects beyond rear plate 10a. Said projection may be provided with flats to facilitate turning with a wrench. Rotation of the spring tension spool in this manner enables the compressive forces on the spring 21 to be varied, and thereby adjusts the downward pressure on the presswheel 5 transmitted through the linkage of the rod 9 and the strut or crank 6 (FIG. 1) without affecting vertical displacement of the presswheel.

Thus, it will be seen that elements 10a, 20, 20a, 21 and threaded rod 9 provide the second adjustable down-pressure means referred to in the Summary that is connected to the wheel without affecting vertical displacement of the wheel.

Referring to FIGS. 1 and 2, servo action is provided by cam spool 18 cooperating with a cam-operated valve 31 that is connected to rear plate 10a. A cam roller 32 connected to the valve rides up and down on the cam surface 18a of the cam spool. If presswheel 5 moves upward due to, for example, a change in ground elevation, then the upper arm extremity 6c of strut or crank 6 that connects the presswheel to the rod will be moved to the right (as viewed in the figures), thereby moving the cam spool to the right, which lowers cam roller 32. This action causes valve 31 to increase fluid pressure in the upper chamber of double acting cylinder 4, thereby positively lifting implement frame 3, to reestablish the predetermined vertical distance or displacement between the ground contact implement and the presswheel.

Downward movement of the presswheel causes the cam spool 18 to move to the left, thereby causing cam roller 32 to move upward on the cam surface of cam spool 18, which in turn causes fluid pressure to be increased in the lower chamber of the double acting cylinder 4, thereby lowering the implement and reestablishing the predetermined vertical displacement between implement and presswheel.

As can be seen in FIG. 2, movement of the cam spool is limited, at the one extreme, by the shoulder at the left end of the cam spool pressing against front plate 10, and, at the other extreme, by a lip 16a on input spool 16 bearing against the front plate. When the input spool is centered between these two extremes, the cam spool 18 is in its neutral or stable position.

When the compressive force of spring 21 is varied by turning spring tension spool 20 while holding rod 9 in place, there may be a momentary displacement of the cam spool from its neutral position, but the servo action of valve 31 (triggered by movement of cam roller 32) immediately will restore the cam spool to its neutral position which is at about the halfway point of cam surface 18a. In this manner, the distance D (FIG. 2) from pivot 11a to pivot 12a essentially remains unchanged. It is in this context that the present invention is able to alter the compressive force upon the presswheel without affecting the vertical displacement of the presswheel.

Figure 3:
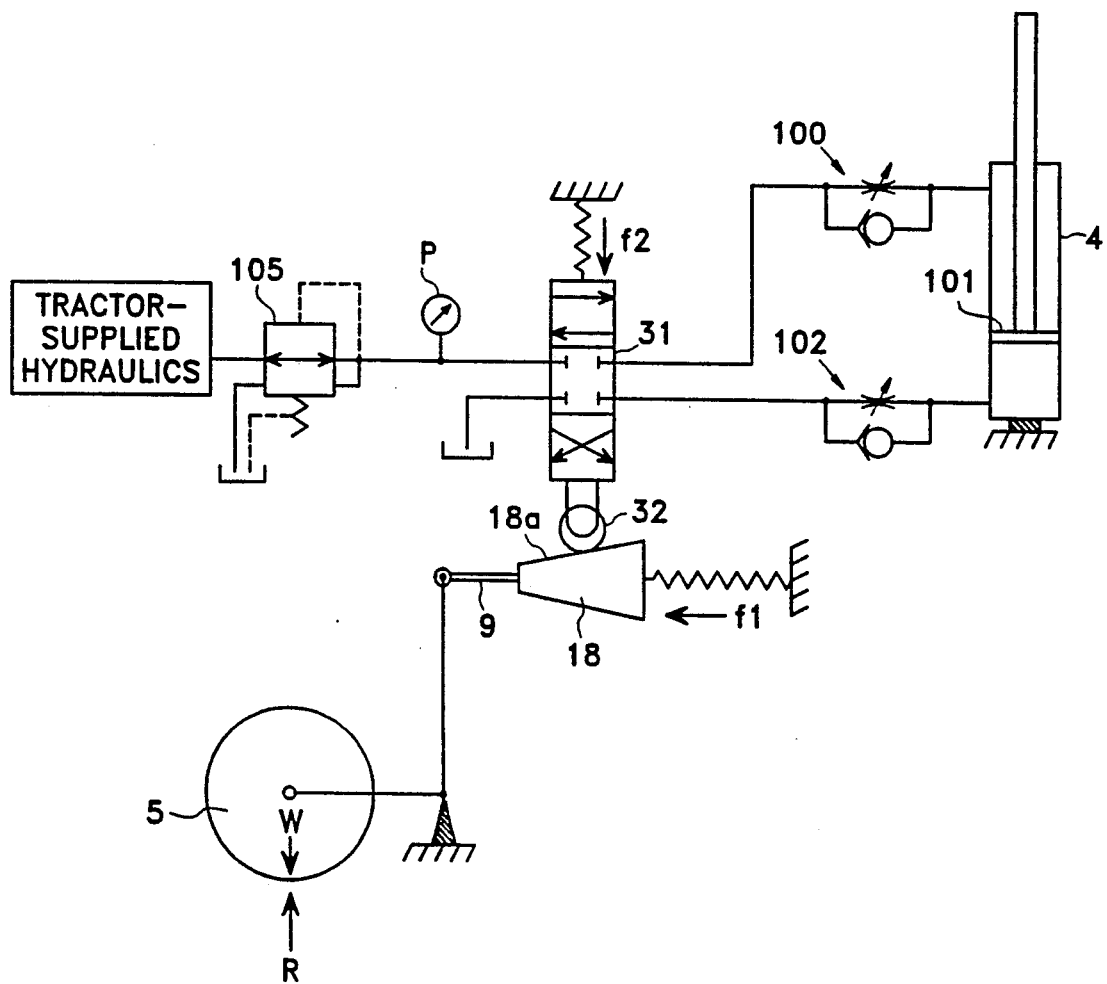
FIG. 3 is a partially schematic view of the hydraulics and dynamics of the present invention.

The hydraulics and dynamics of the system further are illustrated in FIG. 3. When the control is active (the ground contact implement is attached to a tractor and the hydraulic circuit is complete), the force of the presswheel 5 on the soil (the reverse of the upward force R of the soil) is the algebraic sum of the weight W of the presswheel, the force f1 of the spring 21, and the force f2 of the internal spring of valve 31 multiplied by the sine of the angle of the cam surface 18a of cam spool 18.

When R (the upward force of the soil) is greater than the algebraic sum of forces within the control, cam spool 18 is moved to the right allowing valve 31 to shift downward and transmit oil from a hydraulic pressure source through valve 100 so as to move piston 101 downwardly in cylinder 4, thereby providing a positive lift the implement frame and restoring equilibrium. The displaced oil below the piston is sent to a sump through valve 102. Conversely when the soil strength is less than the algebraic sum of forces, the control works in the opposite direction so that oil is transmitted from the hydraulic pressure source through valve 102 to move piston 101 upwardly, and thereby lower the implement frame. Thus, elements 9, 16, 18, 18a, 31 and 32 provide control means operably connected to the wheels and cylinder 4 to maintain a substantially constant vertical distance between the wheels and implement.

The desired reactive force is set by adjusting force f1 of spring 21. Small changes in f1 are accomplished by altering the compression of the spring by means of the spring tension spool (FIG. 2, reference numeral 20). As noted above, such changes in the spring tension spool do not affect the relative displacement between the presswheel and ground contact implement. In some instances, requisite range changes in the downward force on the presswheel may require replacing the spring with one of a different constant.

With the forces at equilibrium, the spatial relationship of the presswheel to the implement frame is constant, and therefore the control also operates to maintain a constant depth for the ground contact implement such as a seeder.

The pressure reducing valve 105 with a built-in pressure relief feature reduces the tractor-supplied hydraulic pressure to predetermined pressure P, and provides an oil relief pathway to prevent pressures greater than the predetermined pressure. Pressure P sets the hydraulic gain (i.e., the maximum force available for raising or lowering the ground contact implement) and prevents mechanical damage by limiting the maximum reactive force.

Valves 100 and 102 allow free flow of oil into ports leading to the chambers above and below piston 101, but provide adjustable restriction for flow out of the ports thereby regulating the speed of response. Stable operation of the servo control system can be obtained by adjustment of P, flow control valves 100 and 102, and the angle of the cam surface on cam spool 18.

Typical dimensions of the apparatus of the present invention are as follows:

rod 9: $\frac{1}{2}'' \times 10''$ long with 13 threads per inch;
side plates 11: $2''$ tall $\times 6''$ wide $\times \frac{1}{4}''$ thick;
front and rear plates 10 and 10a: $2''$ tall $\times 3\frac{1}{4}''$ wide $\times \frac{1}{2}''$ thick;
input spool 16: $1\frac{3}{4}''$ long $\times 1''$ diameter with a $\frac{3}{8}$ long $\times 2''$ diameter shoulder (the sliding body moves plus or minus 0.375'' from neutral position);
cam spool 18: $1\frac{3}{4}''$ diameter $\times 3\frac{3}{4}''$ long;
cam spool cone 18a: $1\frac{3}{4}''$ minimum diameter, $2\frac{1}{4}''$ maximum diameter;
spring tension spool 20: $\frac{3}{4}''$ outside diameter $\times 4\frac{1}{2}''$ long having 6 flats $5/8'' \times \frac{1}{4}''$;
spring tension spool lip 20a: $\frac{1}{8}'' \times 15/16''$ diameter;
spring 21: 7/8'' internal diameter $\times 3\frac{1}{2}''$ long with spring constant of 15 to 100 pounds per inch;
presswheel 5: 14'' diameter $\times 3''$ deep;
double acting cylinder 4: 2'' diameter $\times 8''$ stroke;
servo valve 31: 3 gallon per minute, cam operated 4-way spool, 0.160'' travel from seal to seal, 30 pound cam spring, 5'' long $\times 2\frac{1}{4}''$ square.

Alternative embodiments include: the use of fluids other than oil, such as air; the use of hydraulic flow control valves other than a 4-way valve, such as pilot operated servo valves; the use of other internal cam designs or linkages such as a rotary cam; the use of other bias spring designs such as torsion spring, air or hydraulic piston; the use of other gauge or presswheels such as a wheel preceding the planter frame or wheels fore and aft of a seed furrow opener connected with a level system so that both are active; the use of pressure balance control in place of the cam operated valve, such as a pilot operated pressure control valve regulating pressure to one side of the hydraulic cylinder with a pressure loaded accumulator connected to the other cylinder port.

I claim:
1. Apparatus for controlling the depth of soil penetration of a ground contact implement
   a. first adjustable downpressure means connected to said ground contact implement;
   b. depth gauging wheel means adjacent said implement;
   c. means to adjust the vertical displacement of said wheel means so as to establish a predetermined vertical distance between said wheel means and implement;
   d. control means operably connected to said wheel means and said first adjustable downpressure means to control the degree of downpressure on said implement in response to upward or downward movement of said wheel on said soil, so as to maintain a substantially constant vertical distance between said wheel means and implement; and
   e. second adjustable downpressure means connected to said wheel means to adjust the downpressure thereon without affecting the vertical displacement of said wheel means.

2. The apparatus of claim 1 wherein said first adjustable downpressure means includes adjustable positive lifting means connected to said implement; wherein said control means is operably associated with said wheel and lifting means to control the amount of positive lift on said implement in response to upward or downward movement of said wheel, so as to help maintain a substantially constant vertical distance between said wheel and implement.

3. The apparatus of claim 1 wherein said means to adjust the vertical displacement of said wheel means comprises
   a. rod means;
   b. first pivot means connected to one end of said rod means;
   c. second pivot means adjacent the opposite end of said rod means;
   d. means to move said first pivot means along said one end of said rod means;
   e. means connecting said first pivot means to said wheel means;
   f. means connecting said second pivot means to said first adjustable down pressure means.

4. The apparatus of claim 2 wherein said first adjustable downpressure means comprises a double acting hydraulic cylinder.

5. The apparatus of claim 3 wherein said second adjustable downpressure means comprises a compression spring surrounding said rod means; spring tension means surrounding said rod means to compress said spring; and means to move said spring tension means along said rod means.

6. The apparatus of claim 5 wherein said first adjustable downpressure means comprises a double acting hydraulic cylinder.

* * * * *